US010228766B2

(12) United States Patent
Bhesania et al.

(10) Patent No.: US 10,228,766 B2
(45) Date of Patent: Mar. 12, 2019

(54) ENHANCED DISPLAY ROTATION

(71) Applicant: Microsoft Technology Licensing, LLC, Redmond, WA (US)

(72) Inventors: Firdosh Kersy Bhesania, Kirkland, WA (US); Ahmed Smahi, Woodinville, WA (US); Pradipta Ariyo Bhaskoro Hendri, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/484,647

(22) Filed: Sep. 12, 2014

(65) Prior Publication Data
US 2016/0077592 A1 Mar. 17, 2016

(51) Int. Cl.
*G06F 3/01* (2006.01)
*G06T 3/60* (2006.01)
(Continued)

(52) U.S. Cl.
CPC ............ *G06F 3/017* (2013.01); *G06F 3/011* (2013.01); *G06F 3/012* (2013.01); *G06F 3/013* (2013.01);
(Continued)

(58) Field of Classification Search
CPC .................................................. G06F 3/04845
(Continued)

(56) References Cited

U.S. PATENT DOCUMENTS 6,037,882 A * 3/2000 Levy ........................ G06F 3/011
340/11.1
6,842,175 B1 * 1/2005 Schmalstieg ............ G06F 3/011
345/427
(Continued)

FOREIGN PATENT DOCUMENTS

| EP | 1501019 A2 | 1/2005 |
| WO | 2013162564 A1 | 10/2013 |
| WO | WO-2014000123 | 1/2014 |

OTHER PUBLICATIONS

"International Search Report & Written Opinion Issued in PCT Application No. PCT/US2015/049539", dated Nov. 17, 2015, 18 Pages.
(Continued)

*Primary Examiner* — Javid A Amini
(74) *Attorney, Agent, or Firm* — Han Gim; Newport IP, LLC

(57) ABSTRACT

Enhanced display rotation techniques are described in which arrangement of on-screen elements and user interfaces may be controlled based upon a combination of inputs from a sensor system of a device indicative of positional relationships. Output positions for elements are controlled in dependence upon a calculated position of a user in relation to the device and alignment of the device with a magnetic direction. The position and alignment may be derived based on sensor data, including at least a camera to obtain eye tracking data and a compass used to determine an alignment of the device. Other factors may also be considered such as
(Continued)

data from an accelerometer, facial tracking by the camera, gaze detection, a proximity sensor, and other sensor data. Responsive to manipulation of the device, rotation and/or location of the elements may be controlled in accordance with the positional relationships that are ascertained.

20 Claims, 10 Drawing Sheets

(51) Int. Cl.
G06F 3/0484 (2013.01)
G09G 5/32 (2006.01)
G09G 3/20 (2006.01)
G06F 3/03 (2006.01)
G06F 3/0346 (2013.01)
G06F 1/16 (2006.01)

(52) U.S. Cl.
CPC ............. *G06F 3/03* (2013.01); *G06F 3/0346* (2013.01); *G06F 3/04845* (2013.01); *G06T 3/60* (2013.01); *G09G 3/20* (2013.01); *G09G 5/32* (2013.01); *G06F 1/163* (2013.01); *G06F 1/1626* (2013.01); *G06F 2200/1614* (2013.01); *G06F 2200/1637* (2013.01); *G06F 2203/04105* (2013.01); *G06F 2203/04108* (2013.01); *G06T 2200/24* (2013.01); *G09G 2340/0464* (2013.01); *G09G 2340/0492* (2013.01); *G09G 2340/14* (2013.01); *G09G 2354/00* (2013.01)

(58) Field of Classification Search
USPC ....................................................... 345/650
See application file for complete search history.

(56) References Cited

U.S. PATENT DOCUMENTS

| | | | | |
|---|---|---|---|---|
| 8,358,321 | B1* | 1/2013 | Weidner | G09G 5/00 345/619 |
| 8,379,059 | B2* | 2/2013 | Shih | G06F 1/1694 345/158 |
| 8,471,869 | B1 | 6/2013 | Tseng | |
| 8,704,879 | B1* | 4/2014 | Cheng | G06F 3/013 348/51 |
| 9,437,038 | B1* | 9/2016 | Costello | G06T 15/08 |
| 2004/0201595 | A1* | 10/2004 | Manchester | G06F 1/1626 345/649 |
| 2005/0276164 | A1 | 12/2005 | Amron | |
| 2007/0252833 | A1* | 11/2007 | Kuroki | G06T 15/20 345/427 |
| 2008/0266326 | A1 | 10/2008 | Porwal | |
| 2009/0295832 | A1* | 12/2009 | Takatsuka | G06F 3/012 345/659 |
| 2010/0066763 | A1* | 3/2010 | MacDougall | G06F 1/1626 345/656 |
| 2010/0156907 | A1* | 6/2010 | VanderSpek | G06T 15/20 345/427 |
| 2011/0032220 | A1* | 2/2011 | Shih | G06F 1/1694 345/204 |
| 2011/0037866 | A1 | 2/2011 | Iwamoto | |
| 2011/0096095 | A1* | 4/2011 | Xu | G06F 3/012 345/657 |
| 2011/0213664 | A1* | 9/2011 | Osterhout | G02B 27/017 705/14.58 |
| 2011/0298829 | A1 | 12/2011 | Stafford et al. | |
| 2012/0081392 | A1 | 4/2012 | Arthur | |
| 2013/0009867 | A1 | 1/2013 | Woo | |
| 2013/0038532 | A1* | 2/2013 | Okura | A63F 13/06 345/158 |
| 2013/0057571 | A1* | 3/2013 | Harris | G06F 1/1613 345/619 |
| 2014/0118256 | A1 | 5/2014 | Sonoda et al. | |
| 2014/0184496 | A1* | 7/2014 | Gribetz | G02B 27/017 345/156 |
| 2014/0240357 | A1 | 8/2014 | Hou | |
| 2014/0375687 | A1* | 12/2014 | Tanaka | G02B 27/0172 345/633 |
| 2015/0082145 | A1* | 3/2015 | Ames | G06F 17/2247 715/234 |
| 2015/0082180 | A1* | 3/2015 | Ames | G06F 3/04815 715/738 |
| 2015/0085621 | A1* | 3/2015 | Hong | G04G 21/00 368/10 |
| 2015/0177906 | A1* | 6/2015 | Yairi | G06T 3/0006 345/648 |
| 2016/0026264 | A1* | 1/2016 | Cheng | G06F 3/0346 345/156 |
| 2016/0073021 | A1* | 3/2016 | Chang | H04N 5/23222 348/37 |
| 2016/0349790 | A1* | 12/2016 | Connor | G06F 1/1694 |
| 2017/0031449 | A1* | 2/2017 | Karsten | G06F 19/3418 |
| 2017/0038845 | A1* | 2/2017 | Chi | H04B 1/385 |

OTHER PUBLICATIONS

"How-To Guides: What Is Smart Screen, and How Do I Use It on My Samsung Galaxy S4?", Retrieved From: <http://www.samsung.com/us/support/howtoguide/N0000006/10588/127186> Aug. 6, 2014, May 15, 2014, 7 Pages.

Cheng, et al., "iRotate: Automatic Screen Rotation Based on Face Orientation", In Proceedings of the SIGCHI Conference on Human Factors in Computing Systems, May 5, 2012, 8 pages.

"Second Written Opinion", Application No. PCT/US2015/049539, dated Jul. 20, 2016, 14 pages.

"International Preliminary Report on Patentability", Application No. PCT/US2015/049539, dated Nov. 29, 2016, 15 pages.

\* cited by examiner

ENHANCED DISPLAY ROTATION

BACKGROUND

Computing devices have been developed to increase the settings in which computing functionality is made available to users. For instance, mobile phones and slate form factor devices (e.g., tablets) have advanced to provide access to content, applications, services, browsing, and other computing functionality in mobile settings. Additionally, availability and use of various kinds of wearable computing devices (e.g., watches, fitness bands, pod devices, glasses, etc.) is steadily increasing.

Since users may easily manipulate mobile devices and wearable devices into the different viewing positions and orientations, it may be challenging to implement schemes for controlling positioning of on-screen elements and user interfaces as the devices are manipulated. Traditionally, devices implement auto-rotation techniques that rely upon accelerometers and upright orientation of the device (e.g., portrait or landscape). However, these accelerometer based techniques may be ineffective and provide incorrect positioning of on-screen elements when a device is placed flat on a surface (e.g., a table) as well as when a user interacting with the device while lying flat or on their side. Moreover, rotation of on-screen elements may be limited to portrait and landscape modes (e.g., ninety degree increments), which may not be sufficient for some scenarios and devices. Consequently, adjustment of on-screen elements and user interfaces using conventional techniques may be inadequate in some use scenarios and provide unexpected adjustments that may lead to user frustration and confusion.

SUMMARY

Enhanced display rotation techniques are described in which arrangement of on-screen elements and user interfaces may be controlled based upon a combination of inputs from a sensor system of a device indicative of positional relationships of the device and a user interacting with the device. In an implementation, output positions for elements are controlled in dependence upon a calculated position of a user in relation to the device and alignment of the device with a magnetic direction. The position and alignment may be derived based on sensor data collected from multiple sensors, including at least a camera to obtain eye tracking data and a compass used to determine an alignment of the device. Other factors may also be considered such as data from an accelerometer, facial tracking by the camera, gaze detection, a proximity sensor, and other sensor data. Responsive to manipulation of the device, arrangement of one or more elements including the rotation and/or location of the elements is controlled in accordance with positional relationships that are ascertained from the collected sensor data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Conventional auto-rotation techniques that rely upon accelerometers and upright orientation of the device (e.g., portrait or landscape) may be ineffective and provide incorrect positioning of on-screen elements when a device is placed flat on a surface (e.g., a table) and when a user interacting with the device while lying flat or on their side. Moreover, rotation of on-screen elements may be limited to turns in ninety degree increments. Consequently, the conventional techniques may be inadequate in some use scenarios and provide unexpected adjustments that result in user frustration and confusion.

Enhanced display rotation techniques are described in which arrangement of on-screen elements and user interfaces may be controlled based upon a combination of inputs from a sensor system of a device indicative of positional relationships of the device and a user interaction with the device. In an implementation, output positions for elements are controlled in dependence upon a calculated position of a user in relation to the device and alignment of the device with a magnetic direction. The position and alignment may be derived based on sensor data collected from multiple sensors, including at least a camera to obtain eye tracking data and a compass used to determine an alignment of the device. Other factors may also be considered such as data from an accelerometer, facial tracking by the camera, gaze detection, a proximity sensor, and other sensor data. Responsive to manipulation of the device, arrangement of one or more elements including the rotation and/or location of the elements is controlled in accordance with positional relationships that are ascertained from the collected sensor data.

By using and selectively switching between different types of sensors and combinations of sensor data, auto-rotation schemes for device may be optimized to conserve power and computing resources. For example, resource intensive sensors like accelerometers may be toggled off in some scenarios. Additionally, the system may be configured to support additional scenarios and provide more accurate auto-rotation results, such as when a user is interacting with a device while lying down and/or when the device is placed on a flat surface like a desk or a table.

In the discussion that follows, a section titled "Operating Environment" is provided and describes one environment in which one or more implementations can be employed. Following this, a section titled "Enhanced Display Rotation Details" describes example details and procedures in accordance with one or more implementations. Last, a section titled "Example System" describes example computing systems, components, and devices that can be utilized to implement one or more implementations.

Operating Environment

Figure 1:
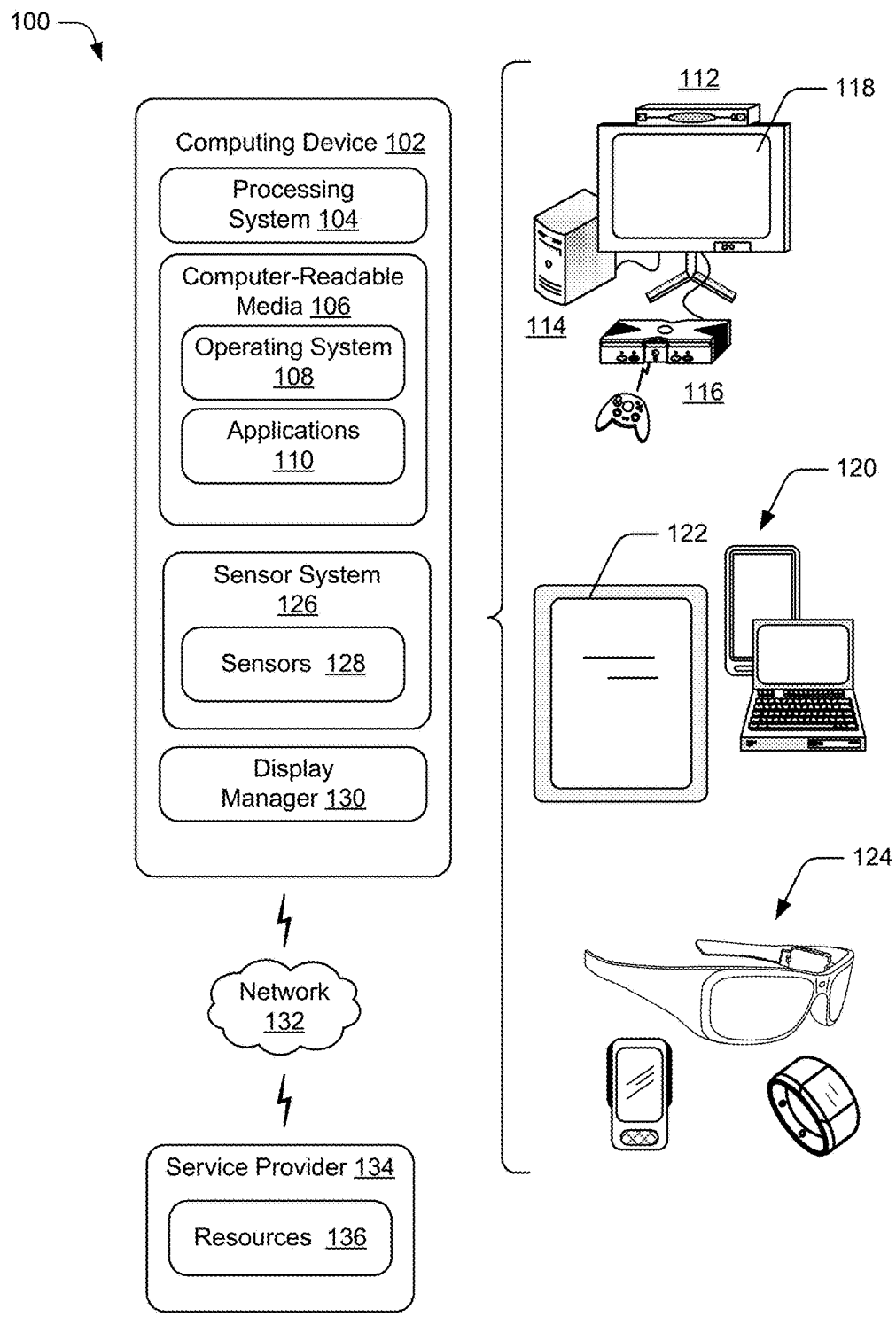
FIG. 1 illustrates an example operating environment in accordance with one or more implementations.

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, a smart band or watch, and a pod device such as clip-on fitness device, media player, or tracker. Other examples of wearable devices 124 include but are not limited to a ring, an article of clothing, a glove, and a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 10.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 10.

The computing device 102 may also include a sensor system 126 having one or more sensors 128 and a display manager 130. The sensor system 126 and one or more sensors 128 are configured to enable collection of a variety of different sensor data. In accordance with techniques described herein, sensor data obtained from the sensors may be processed and/or combined to resolve positional relationships of the computing device and a user interacting with the device. A variety of different types of sensors and techniques suitable to resolve positional relationships may be employed as discussed in greater detail in relation to the following figures.

The display manager 130 is representative of functionality to manage output, arrangement, and rearrangement of user interfaces output via a display device associated with the computing and/or on-screen elements (e.g., icons, tiles, text, images, frames, windows, and so on) that are included as part of the user interfaces. Modification of user interfaces and on-screen elements may occur responsive to manipulation of the computing device. The display manager 130 may also be representative of functionality to collect and process sensor data from the sensor system 126 to make determination regarding how and when to make the modifications of user interfaces and on-screen elements.

In general, sensor data regarding position, alignment, rotation, spacing, location, and/or orientation from multiple different types of sensors is processed in combination to ascertain the positional relationships. As noted above, this may include calculating at least position of the user in relation to the device and determining an alignment of the device with respect to with a magnetic direction (e.g., alignment with the earth's magnetic field). This may additionally include ascertaining a spatial orientation of a device with respect to a user interacting with the device. For example, in response to rotation of the computing device and/or associated display, the display manager 130 may recognize a display change event and cause a corresponding rotation or relocation of the user interface/elements. This may include computation of the positional relationships in accordance with sensor data collected from a plurality of sensors 128. Details regarding these and other aspects of enhanced display rotation techniques are discussed in the following section.

The environment 100 further depicts that the computing device 102 may be communicatively coupled via a network 132 to a service provider 134, which enables the computing device 102 to access and interact with various resources 136 made available by the service provider 134. The resources 136 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Figure 2:
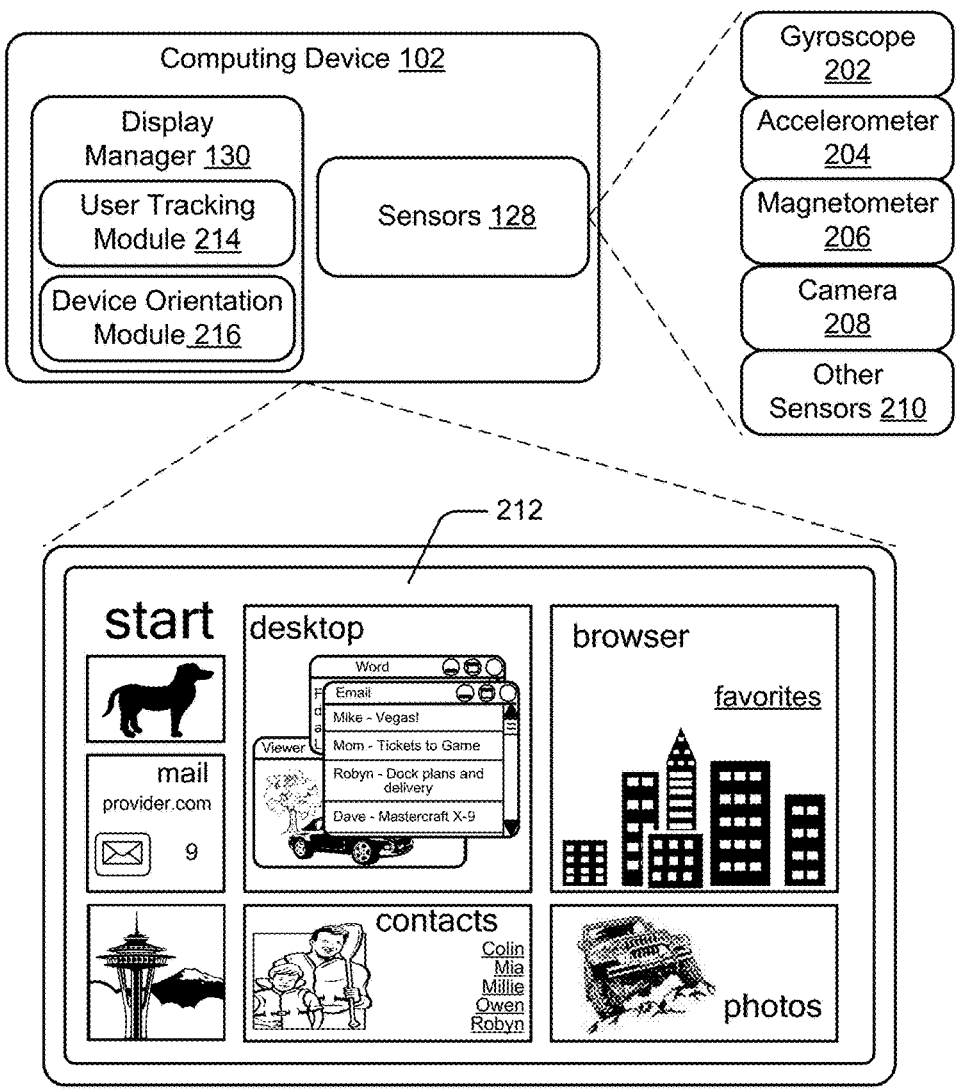
FIG. 2 is diagram depicting example details of a computing device in accordance with one or more implementations.

FIG. 2 depicts generally at 200 example details of a computing device having a display manager 130 and a plurality of sensors 128 configured to enable techniques for enhanced display rotation in accordance with one or more implementations. In the depicted example, the computing device is depicted as being a device with a slate form factor (e.g., a tablet). The sensors 128 may be used to determine positional relationships, which may be expressed as coordinates in a three dimensional coordinate system defined with x, y, and z axes relative to the reference object/point (e.g., the earth). The sensors 128 are illustrated as including a gyroscope 202, an accelerometer 204, a magnetometer 206 or digital compass, and a camera 208.

Generally, a gyroscope uses principles of angular momentum to calculate orientation and rotation. The gyroscope 202 can be used to recognize movement within three-dimensional space and may enable determination of position with respect to a reference object/point, such as the earth. Sensor data from the gyroscope 202, enables computation of a spatial position for the computing device. The spatial position may be expressed as coordinates in a three dimensional coordinate system defined with x, y, and z axes relative to a reference object/point (e.g., the earth).

Sensor data obtained from an accelerometer 204 may be used to obtain components of acceleration as distributed across three axes of the computing device. These components of acceleration can in turn be used to resolve the tilt/orientation of the computing device 102, such as with respect to an x-axis and y-axis of the device. The accelerometer 204 though may be ineffective for determine of orientation relative to the third, z-axis when a device is placed flat on a surface.

The magnetometer 206 may be initialized/configured to act like a compass. In this approach, the magnetometer 206 can be used to compute alignment of the device relative to a magnetic direction. For example, the magnetometer 206 may be used to determine a vector that is parallel to the ground (e.g., the earth's surface). This vector points to magnetic north and can be used to determine rotation of the device, such as with respect to the z-axis. Accordingly, movement of the device may be tracked in each dimension and/or with respect to the three axes even when the device is flat on table.

The camera 208 is representative of one or more kinds of imaging systems that may be integrated with the device including, by way of example and not limitation, a digital camera for capturing images in the visible light spectrum, an infrared camera, a thermal imaging device, an ultraviolet camera, and so forth. The camera is operable to provide image data, including capturing images of a user that can be interpreted to ascertain positional relationships between the user and the device. For example, the camera 208 may enable tracking of the user's eye movement; position of the user's eyes or head; position of the user as being upright, lying down, etc.; distance between the user and the device; angles at which the user is interacting with the device, and other information related to the position and/or alignment of a user with respect to the device.

A variety of other sensors 210 may also be provided, such as a proximity sensor, infrared detector, microphone, thermometer, a global positioning satellite (GPS) radio, and so forth. The different sensors 128 may be used individually and in various combinations to derive various positional relationships as well as multiple independent position computations. In order to manage power usage and allocation of computing resource, different combinations of sensors may be provided with different devices. Additionally, sensors associated with a particular device may be selectively activated or deactivated in different scenarios.

As noted, the display manager 130 may operate to control various aspects of rendering a user interface 212 via a display device of the computing device 102. This includes controlling the arrangement of the user interface 212 in response to display events such as rotation of the device, a change in alignment or positions of a user, and other manipulations. By way of example and not limitation, controlling the arrangement of the user interface may include causing rotation the user interface or elements in the user interface and/or selecting output locations for elements to correspond to positional relationships calculated using sensor data from the sensors 128.

Accordingly, the display manager 130 may represent various functionality that may be invoked to process and interpret sensor data collected via the sensors 128, recognize manipulation of the device and display events indicated by the sensor data, resolve positional relationships, and make adjustments to the arrangement of user interfaces and on-screen elements accordingly. In order to do so, the display manager 130 may include or otherwise make use of a user tracking module 214 and a device orientation module 216 as represented in FIG. 2.

The user tracking module 214 represents functionality operable to resolve positional relationships between the device and users using sensor data from one or a combination of sensors 128. The device orientation module 216 represents functionality operable to determine spatial positions of the computing device (e.g., "device orientation") relative to a reference (e.g., generally the earth's surface) using one or a combination of sensors 128. In one or more implementations, the display manager 130 is configured to make decisions regarding how and when to modify the user interface based on a combined analysis of sensor data represented by both the user tracking module 214 and device orientation module 216 to resolve positional relationships. For example, the display manager 130 may operate to control output positions and/or angular rotations for elements according to a position of a user in relation to the device calculated via the user tracking module 214 using image data from a camera 210 and alignment of the device with a magnetic direction (e.g., the earth's magnetic field) calculated via the device orientation module 216 using data from a magnetometer 208. A variety of other examples in which the display manager 130 makes use of a combination of data from a plurality of sensors 128 to control auto-rotation and arrangement of UIs/elements are also contemplated.

Having described an example operating environment, consider now example details and techniques associated with one or more implementations of enhanced display rotation.

Enhanced Display Rotation Details

This section provides a discussion of example procedures and example display adjustment scenarios that illustrate details of enhanced display rotation techniques in accordance with one or more implementations. The example procedure(s) described herein can be implemented in connection with any suitable hardware, software, firmware, or combination thereof. In at least some embodiments, the procedures can be implemented by way of a suitably configured computing device, such as the example computing device 102 of FIG. 1 that includes or otherwise makes use of a display manager 130.

Additionally, the procedures described in this document may be implemented utilizing the previously described environment, system, devices, and components and in connection with any suitable hardware, software, firmware, or combination thereof. The procedures may be represented as a set of blocks that specify operations performed by one or more entities and are not necessarily limited to the orders shown for performing the operations by the respective blocks.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples in this description.

Figure 3:
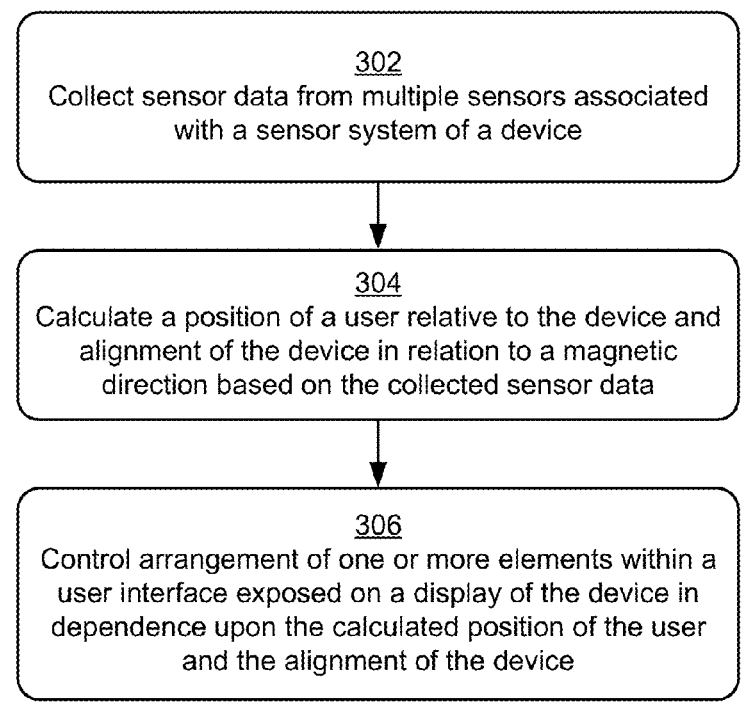
FIG. 3 is a flow diagram that describes details of an example procedure for controlling arrangement of elements of a user interface in accordance with one or more implementations.

FIG. 3 is a flow diagram that describes details of an example procedure 300 in accordance with one or more implementations. Sensor data is collected from multiple sensors associated with a sensor system of a device (block 302). For example, a display manager 130 may be configured to collect and analyze various sensor data from sensors 128 as discussed above. Various sensors and combinations of sensors may be employed, such as the example sensors 128 noted previously. A position of a user relative to the device and alignment of the device in relation to a magnetic direction are calculated based on the collected sensor data (block 304). The position of the user may be based at least in part upon user tracking, such as via user tracking module 214. The user tracking may include, by way of example and not limitation, tracking of the user's eyes via a camera of the device. For instance, movement of the user's eyes may be detected to recognize how the user's is reading text and viewing other content and in turn identify how the user is positioned relative to the device. Additional indications such as a gaze angle, eye alignment and positions, head position, body position, distance, and so forth may be used along with eye movement to resolve the position of the user.

Generally, the alignment of the device in relation to a magnetic direction is based upon sensor data from a magnetometer or compass. The alignment of the device may be computed via a device orientation module 216 as noted previously or using equivalent functionality. Here, the magnetic direction refers to a vector parallel the Earth's surface (e.g., the ground plane) that is used to determine rotation of the device. The vector is determined in relation to the Earth's magnetic field according to principles of magnetism. For instance, the vector may point to magnetic north and can therefore be used to determine rotation of the device with respect to an axis perpendicular to the vector direction. Accordingly, the vector may be used to determine rotation of the device with respect to a z-axis when a device is placed on a flat surface. Naturally, rotation of a device in an upright position may be computed in a comparable fashion by measuring a corresponding vector. In an implementation, a computing device may include multiple magnetometers or compasses to support determination or rotational positions with respect to different axes and device positions.

Then, arrangement of one or more elements within a user interface exposed on a display of the device is controlled in dependence upon the calculated position of the user and the alignment of the device (block 306). For example, the display manager 130 may cause rearrangements of individual elements as well as user interfaces (UIs) as a whole based at least in part upon the calculated position and the alignment of the device determined in the manner just described. The rearrangements may include auto-rotation of the displayed elements and UIs to match the user position and device alignment, relocation of elements/UIs between different display locations such as different available displays or separate and distinct portions of the same display, selectively showing and hiding different content, and so forth. Generally speaking, the rearrangements occur to align content shown via the device to make it easy for the user to view and interact with the content irrespective of the position of the user or orientation of the device.

By way of example and not limitation, controlling arrangement of the one or more elements may include causing rotation of the user interface between two or more pre-defined positions. The pre-defined positions may correspond to angular increments associated with three-hundred and sixty degree rotation of the device around one of the axes. For instance, a device may switch between a portrait display mode and a landscape display mode by counter-rotating elements/UIs in response to changes in the orientation of the device. Here, the angular increment may correspond to ninety degrees.

However, the display manager 130 may also be configured to support more granular rotations at a variety of different angular increments. In one approach, a user selectable control may be exposed that enables selection between different types of auto-rotation, numbers of pre-defined positions utilized, and/or corresponding angular increments. Different angular increments may also be set by a developer of the device. The increments may also be selectively varied for different devices, scenarios, applications, and/or contexts. By way of example, the angular increment may be set within a range of about ninety degrees or less, although larger increments are also contemplated (e.g., one-hundred and twenty degrees for a triangular device). Rotation of elements/UIs may occur to multiple different angular positions in accordance with the angular increment to compensate for manipulation of the device. At ninety degrees, the elements/UI may auto-rotate between two vertical and two horizontal orientations in response to manipulation of the device (e.g., portrait and landscape mode). At smaller increments, auto-rotation occurs at more frequent intervals. At very small angular increments of about one degree or less, the on-screen content may appear to rotate into continuous positions around the display in response to manipulation of the device.

For instance, a degree increment of one degree may be set to enable arrangements into three-hundred and sixty angular positions. The very small increments of one degree or less may be well suitable for wearable devices having circular or spherical displays, but may also be used with rectangular shaped displays or other multi-edged devices. In another example, different angular positions corresponding to degree increments of less than forty-five degrees may be employed, which produces eight or more pre-defined positions. For other devices, scenarios, applications and/or contexts degree increments in a range of about ten degrees or less may be specified.

Controlling arrangement of the elements/UIs may also include alignment of the elements with a viewing plane established by the calculated position of the user of the device. As mentioned, various user tracking may be employed to recognize the positional relationship of a user to the device. This may include tracking eye movement and other indicators to establish a viewing direction and/or viewing plane associated with the user position. Content in the user interface may be aligned to correspond to the viewing plane and/or direction that is established to make it easier for the user to interact with the content. Thus, auto-rotation between landscape and portrait mode may occur when the user is in an upright position. Auto-rotation may also occur when the user is in a lying down position. In each case, the content may be aligned according to the viewing plane and/or direction of viewing. For instance, lines of text, images, pages, and other content items may be oriented generally parallel to a line between the user's eyes. As such, auto-rotations may be handled differently when the user is in different positions, further details of which are discuss in relation to the following example scenarios.

Figure 4:
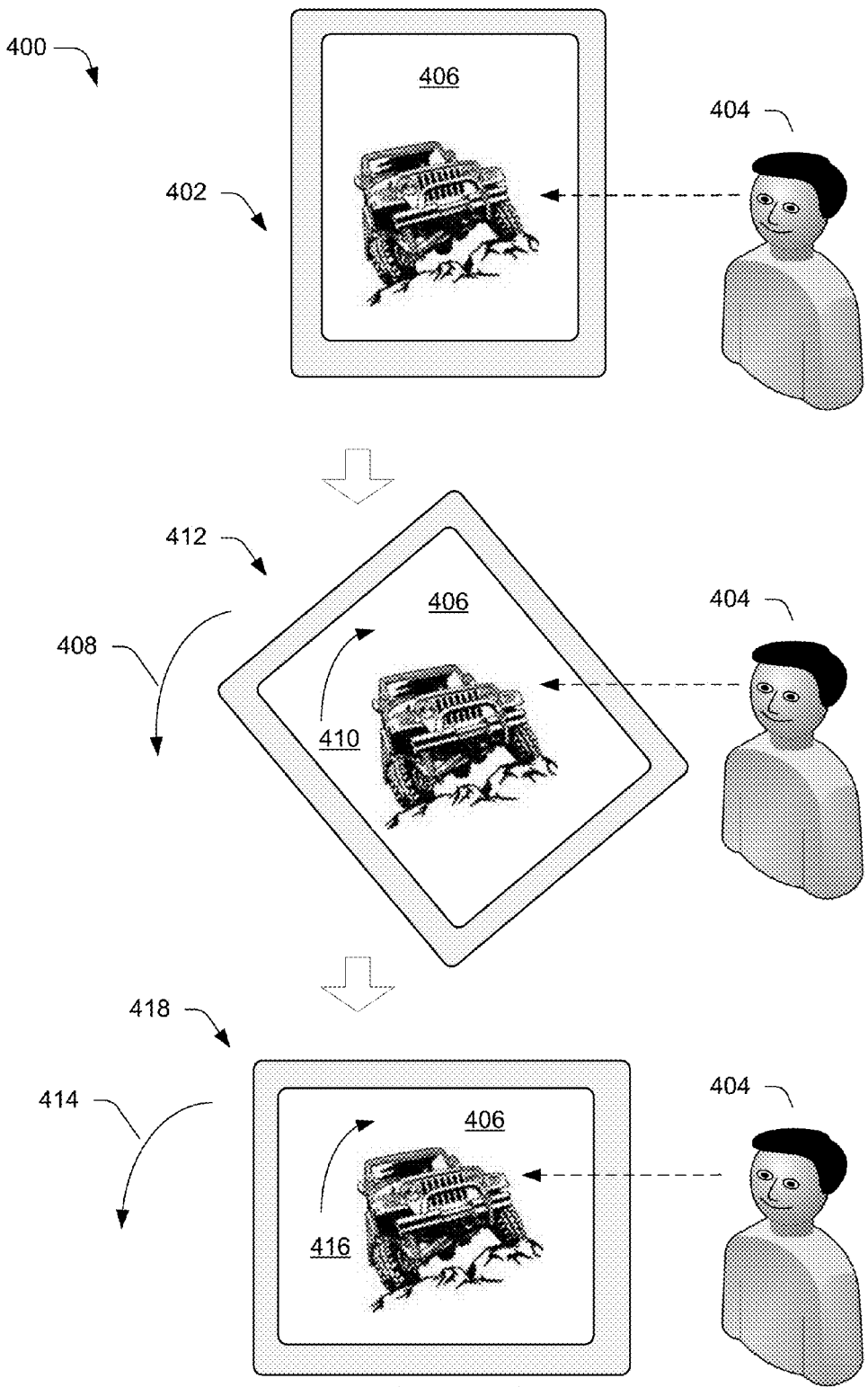
FIG. 4 is a diagram illustrating details of an example display rotation scenario in accordance with one or more implementations.
Figure 5:
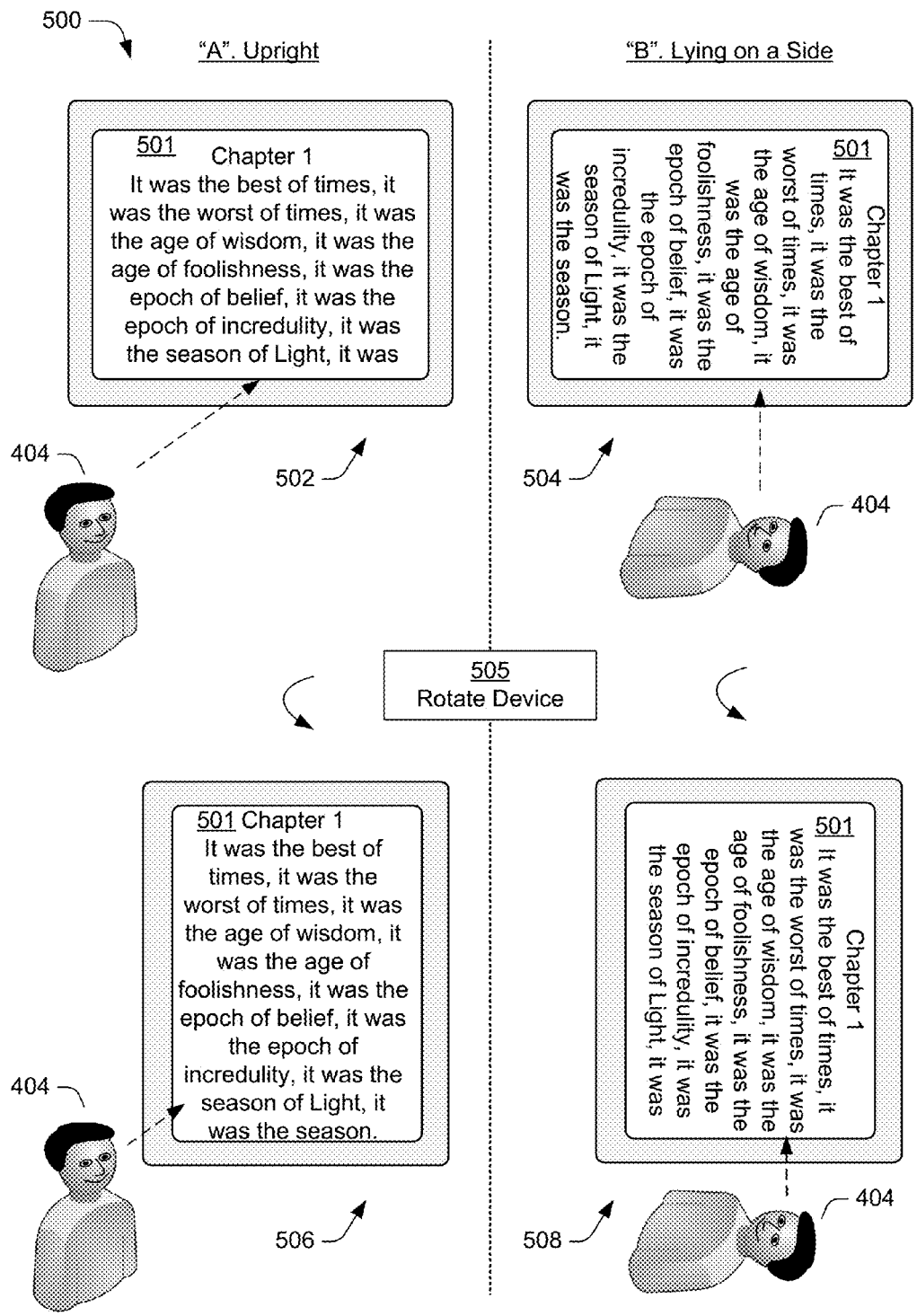
FIG. 5 is a diagram illustrating details of another example display rotation scenario comparing upright and lying down positions in accordance with one or more implementations.
Figure 6:
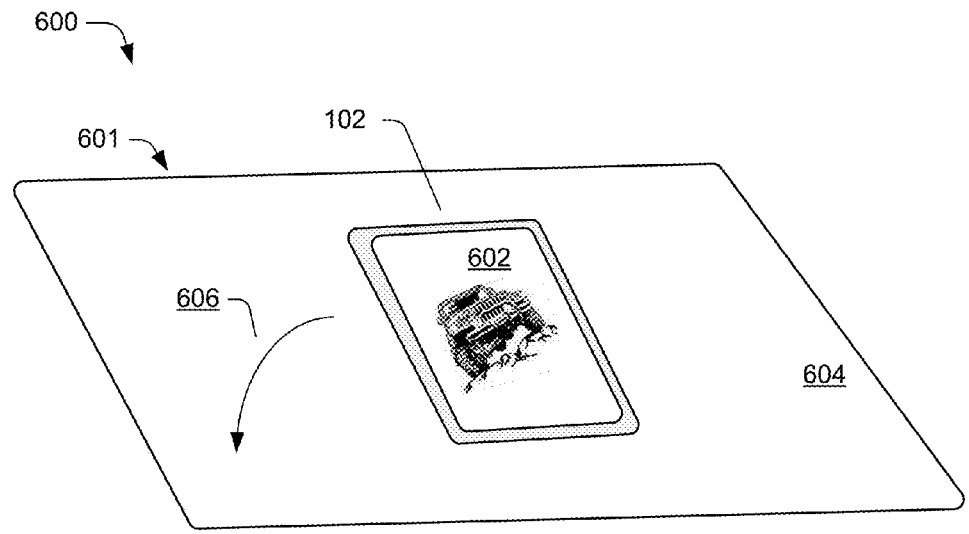
FIG. 6 is a diagram illustrating details of another example display rotation scenario with a device lying flat on a surface in accordance with one or more implementations.
Figure 6:
Figure 6:
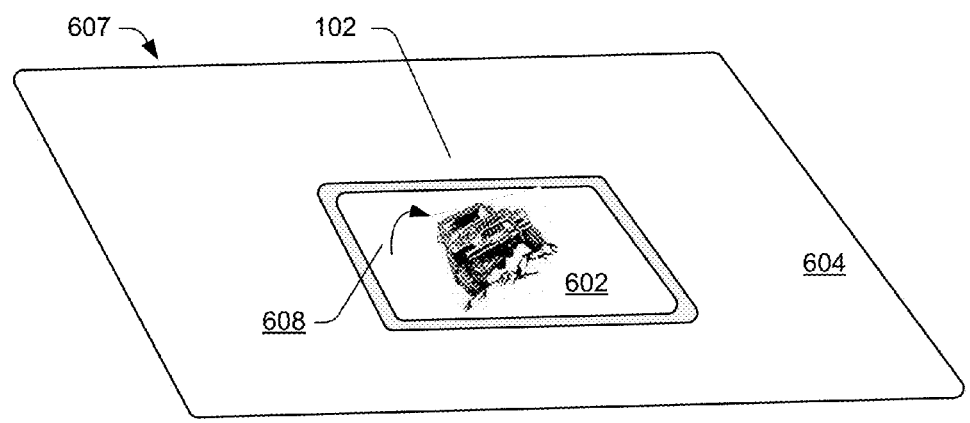

Additionally, controlling arrangement of the elements/UIs may include switching display of the content between multiple different display locations provided by the device to compensate for manipulation of the device. This may involve causing modifications to move displayed items between different display locations of a single display device, such as repositioning text, images, windows, or the UI based on the user position and device alignment. In another example, a device may have multiple separate and distinct display portions, such as watch or band having at least two different display areas around an exterior surface of the device. Additionally, a device may be configured to have two or more different display devices, such as a tablet having a main touch screen and a supplemental display on the backside of the tablet or associated with a case or accessory for the tablet that may be used to display some content, such as notifications, message previews, reminders and so forth. Thus, displayed items may also be rearranged between different display locations of different display devices using the techniques described herein FIGS. 4 to 6 depict some example scenarios that illustrate details and additional aspects of the enhanced display rotation techniques discussed in relation to the preceding example environment, devices, components, and procedures. In particular, FIG. 4 is a diagram illustrating generally at 400 details of an example display rotation scenario in accordance with one or more implementations. FIG. 4 depicts aspects of applying an auto-rotation scheme to arrange elements and UIs using positional relationship derived based on sensor data from a combination of sensors.

The example depicts an initial state 402 in which a user 404 is viewing a user interface 406 displayed on a display of a computing device. In this example, the computing device is illustrated as having a slate form factor (e.g., a tablet) in a portrait orientation. Of course other configurations of computing devices are also contemplated, examples of which are discussed above and below. User interface 406 is shown as presenting rendered content in the form of an image of a jeep, which may be included in a webpage or other document. In the initial state 402, the user 404 is in an upright position and the computing device is in the portrait orientation as mentioned. Here, the rendered content is aligned according to the upright position of the user with respect to the device and the alignment of the device (e.g., portrait orientation).

Now, manipulation of the device may trigger display events that the display manager 130 may recognize and respond to by controlling arrangement of elements/UI in the described manner. For example, rotation 408 of the device may trigger the display manager 130 to counter rotate 410 the user interface 406 to compensate for the rotation 408 and maintain alignment with the user's position. Note that in this example, rotation 408 is less than ninety degrees, but the user interface 406 is nonetheless counter rotated to achieve the state 412. Any suitable animations, transitions, and/or visual cues may be employed to represent the switch between states. Further manipulation of the device may trigger display manager 130 to cause rotation of the elements/UI to achieve a different position and state. For example, additional rotation 414 may trigger the display manager 130 to counter rotate 416 the user interface 406 to compensate for the rotation 414 and achieve the state 418, which again maintains alignment with the user's position.

Thus, in accordance with the example of FIG. 4, the angular rotation and positions employed for auto-rotations may be controlled based on settings for angular increments as discussed previously or by otherwise designating a plurality of pre-defined positions. Auto-rotations may occur to compensate for device manipulation, which may be determined using various sensors as discussed above and below. Such manipulations can also help make reading easier while walking/moving by compensating for hand corrections. If the position of the user changes in addition to or in lieu of manipulation of the device, the display manager 130 may operate to control arrangement of the elements/UI to compensate for changes in position of the user. In this way, auto-rotations or other rearrangements of the elements/UI may track changes in user position, such as when a user tilts their head, switches from sitting to lying down, and so forth. Auto-rotations or other rearrangements may also be based on a combination of user position and device orientation/alignment.

FIG. 5 is a diagram illustrating generally at 500 details of another example display rotation scenario comparing upright and lying down positions in accordance with one or more implementations. As noted above, auto-rotations may be handled differently when the user is in different positions. Generally, elements and UIs may be arranged to correspond to the user position. In particular, the display manager 130 may be configured to make determinations regarding how and when to change the arrangement of displayed elements/UIs based upon either of both of the device orientation and the user position. In order to do so, the display manager 130 is configured to recognize the user position and make adjustments accordingly. Elements/UIs may be displayed differently based upon different user positions recognized for two interaction scenarios even when the device is arranged in the same orientation for the two interaction scenarios relative to a reference such as the Earth's surface.

By way of example, FIG. 5 provides a comparison of different rotational positions that may occur for a user interface 501 when the user is upright (column "A") versus when the user is lying on their side (column "B"). Here, the user interface 501 is aligned with a viewing angle or viewing plane that it established based on user tracking as described previously. For example, the state 502 represents alignment of the user interface 501 with an upright position of the user with the computing device in a landscape orientation relative to the Earth's surface/ground plane. For the same orientation of the computing device, state 504 represents alignment of the user interface 501 with a lying on a side position of the user. In both state 502 and state 504, the user interface 501 is aligned with the text/content running in the same line as the user's eyes. User tracking via a camera or otherwise enables the display manager to recognize the different user positions and arrange the on-screen content accordingly. Comparison of the two states 502, 504 shows that the user interface 501 is rotated into different rotational positions in the two state relative to one another (e.g., approximately ninety degree rotation). In the absence of user tracking, a display manager 130 relying on accelerometers or other sensor data indicative of the device orientation may be unable to distinguish between the different interaction scenarios represented by state 502 and state 504 and would arrange the UI the same in each case.

In response to rotation 505 of the computing device, the user interface 501 may be counter rotated accordingly as discussed herein or otherwise adjusted to maintain alignment with the recognized user positions. In particular, rotation 505 causes arrangement of the computing device in a portrait orientation relative to the Earth's surface/ground plane. For this arrangement of the device, state 506 represents alignment of the user interface 501 with the upright position such that the text/content in the UI remains aligned to the user position. For the same orientation of the computing device, state 508 represents alignment of the user interface 501 with the lying on a side position of the user. Again, in the absence of user tracking, the display manager 130 may be unable to distinguish between the different interaction scenarios represented by state 506 and state 508 and would arrange the UI the same in each case. In the depicted example, the display manager 130 has recognized and made use of the user position to arrange the UI accordingly. As such, the user interface 501 is rotated into different rotational positions for the two different states 506, 508 (e.g., approximately ninety degree rotation).

FIG. 6 is a diagram illustrating generally at 600 details of another example display rotation scenario with a device lying flat on a surface in accordance with one or more implementations. Here, a state 601 illustrates a computing device 102 having a user interface 602 as being placed flat on a surface, such as a table, a desk, the ground, or a user's lap. While a device is lying flat, accelerometers may be ineffective at determining the rotational position of the computing device within the plane of the surface 604.

In accordance with techniques described herein, the display manager 130 may be configured to detect when the computing device 102 is placed flat on a surface in various ways (e.g., using a light sensor, a mechanical toggle switch, pressure sensors, or data from other sensors). When in the flat position, the display manager 130 utilizes sensor data other than from an accelerometer to recognize device rotations. For example, a magnetometer 206 or other digital compass may be employed to ascertain alignment of the device in relation to a magnetic direction as described previously. In response to rotation of the device within the plane of the surface 604, the display manager 130 may cause auto-rotations or other rearrangements of elements/UIs accordingly.

By way of example, FIG. 6 represents rotation 606 of the computing device 102 to attain a state 607 in which the user interface is counter rotated 608 in the manner previously discussed. The rearrangement may be enabled by selectively activating and/or using a magnetometer 206 for handling auto-rotation when the device is detected as being laid flat. Others sensors may be used when device is held upright, at an angle, and so forth. In general, the display manager 130 may be configured to switch between using different sensors 128 or sets of sensor and/or selectively turn sensors on and off responsive to different device positions. Doing so enables the system to optimize power consumption and resource utilization since sensors associated with relatively high power and resource usage may be avoided in some interaction scenarios by using other kinds of sensors. Additionally, switching between different sensors may provide better control over display rotations because sensors that are suited for use in one interaction scenario may be less effective in other scenarios.

Figure 7:
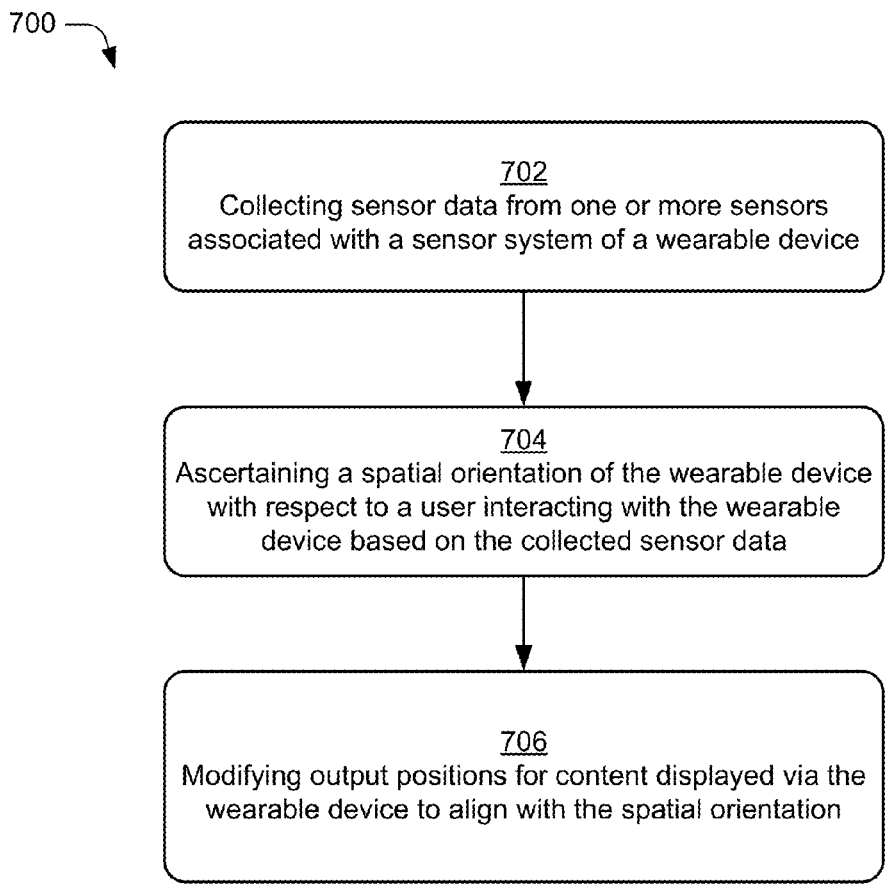
FIG. 7 is a flow diagram that describes details of an example procedure for modifying output positions of content for a wearable device in accordance with one or more implementations.

Generally speaking, the principles and details of techniques for enhanced display rotation discussed in relation to the examples and components of FIGS. 1 to 6 may also be applied to wearable devices 124. To illustrate consider FIG. 7, which is a flow diagram that describes details of an example procedure 700 for modifying output positions of content for a wearable device in accordance with one or more implementations. Sensor data is collected from one or more sensors associated with a sensor system of a wearable device (block 702). For example, a wearable device 124 as discussed in relation to FIG. 1 and elsewhere herein may include a sensor system 126 having various sensors 128 operable to collect sensor data. Sensors 128 employed by a wearable device 124 to implement enhanced display rotation techniques discussed herein may include, but are not limited to, a camera 208 that enables various kinds of user tracking and a magnetometer 206 that facilities determination of an alignment of the wearable device 124 with respect to a magnetic direction. Other kinds of sensors 128 may also be included with wearable device 124.

A spatial orientation of the wearable device with respect to a user interacting with the wearable device is ascertained based on the collected sensor data (block 704). Then, output positions for content displayed via the wearable device are modified to align with the spatial orientation (block 706). For example, sensor data collected via sensors of a wearable device 124 may be analyzed to determine various positional relationships in the manner previously described, which may include computing the spatial orientation of the wearable device. In particular, the wearable device 124 may include or make use of a display manager 130 as described in this document to process sensor data and control display of content via a display device of the wearable device 124 accordingly. In one or more implementations, the display manager 130 is implemented at least partially by hardware elements of the wearable device. This may include execution of software or firmware of the wearable device 124 via a microprocessor or other processing system associated with the wearable device 124. In addition or alternatively, the display manager 130 may be implemented in hardware via fixed logic circuitry or a system on chip (SoC) integrated with the wearable device 124.

The spatial orientation as used herein may refer to the positional relationship of the device in three-dimensional space. In one or more implementations, the spatial position may be expressed as coordinates in a three dimensional coordinate system defined with x, y, and z axes relative to the reference object/point (e.g., the earth). The spatial orientation may also reflect a viewing angle between the user and a display of wearable device, distance of the wearable device from the user, rotational position of the wearable device, and so forth. Since the wearable device is designed to be worn or otherwise attached to the body of a user, the spatial orientation changes with body movement. For example, a relationship between a display face of a watch worn on a user's wrist and the user's face/eyes changes as the user rotates their wrist, swings their arms, and so forth. The display manager 130, though, may be configured to ascertain the spatial orientation of the wearable device responsive to manipulation of the device caused by body movement and selectively modify the arrangement of elements/UIs presented on the display of a wearable to compensate for the body movement.

By way of example, modifications of output positions by the display manager 130 may involve rotation of a user interface exposed on a display (or elements contained in the UI) of the wearable device 124 into different angular rotations. The display manager 130 may cause rotation of the user interface between two or more pre-defined positions that correspond to angular increments as noted previously. In addition or alternatively, the display manager 130 may modify the output positions by selectively switching output of the content between multiple separate display locations of the wearable device in response to manipulation of the wearable device. As mentioned previously, the separate display locations may correspond to different display locations of a single display device or to two or more individual display devices. Modification of the output positions may be performed based on various manipulations of the wearable device 124. The modifications are intended to align displayed content with the user, thereby making it easy for the user to interact with the content.

Figure 8:
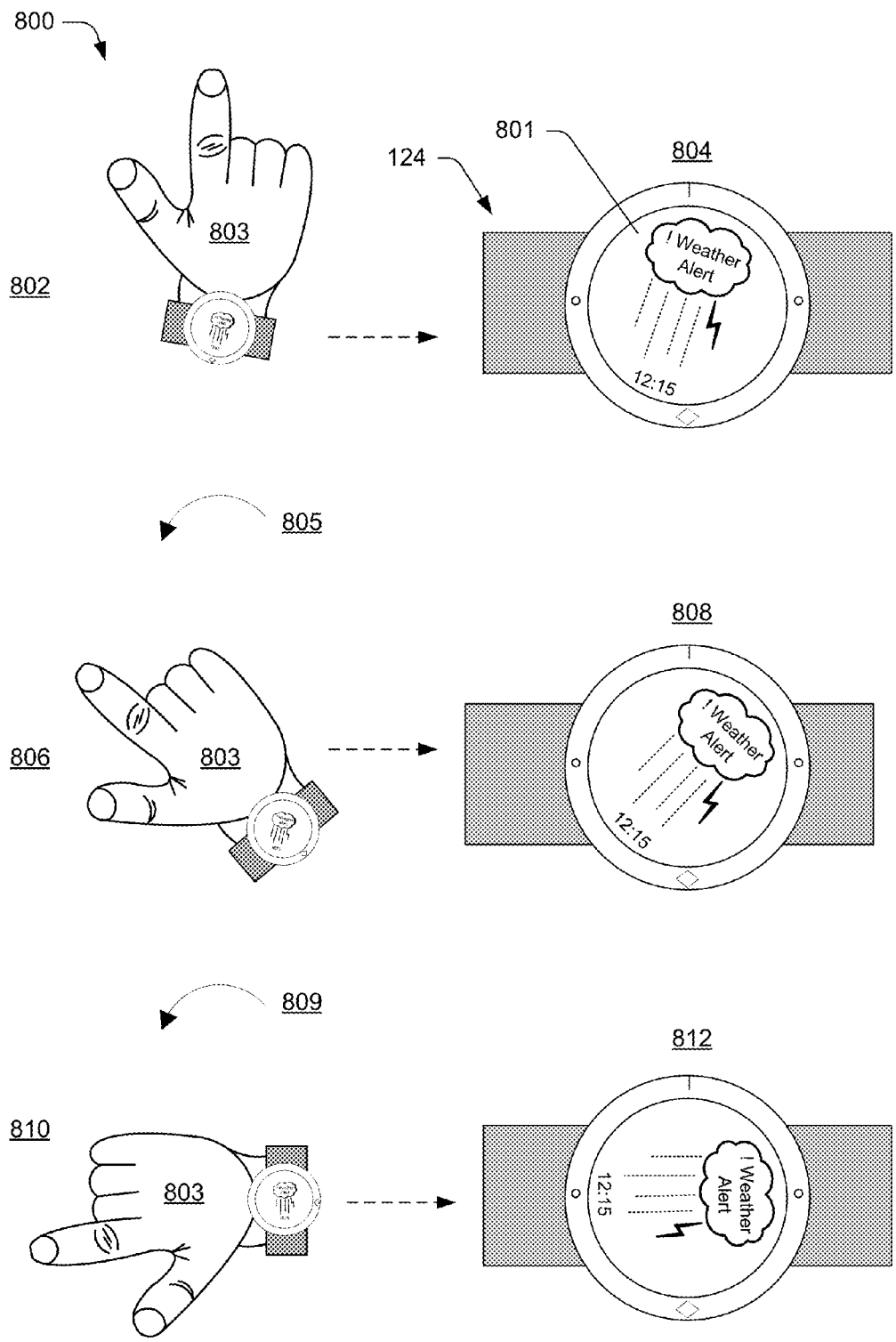
FIG. 8 is a diagram illustrating details of an example display adjustment scenario with a wearable device in accordance with one or more implementations.
Figure 9:
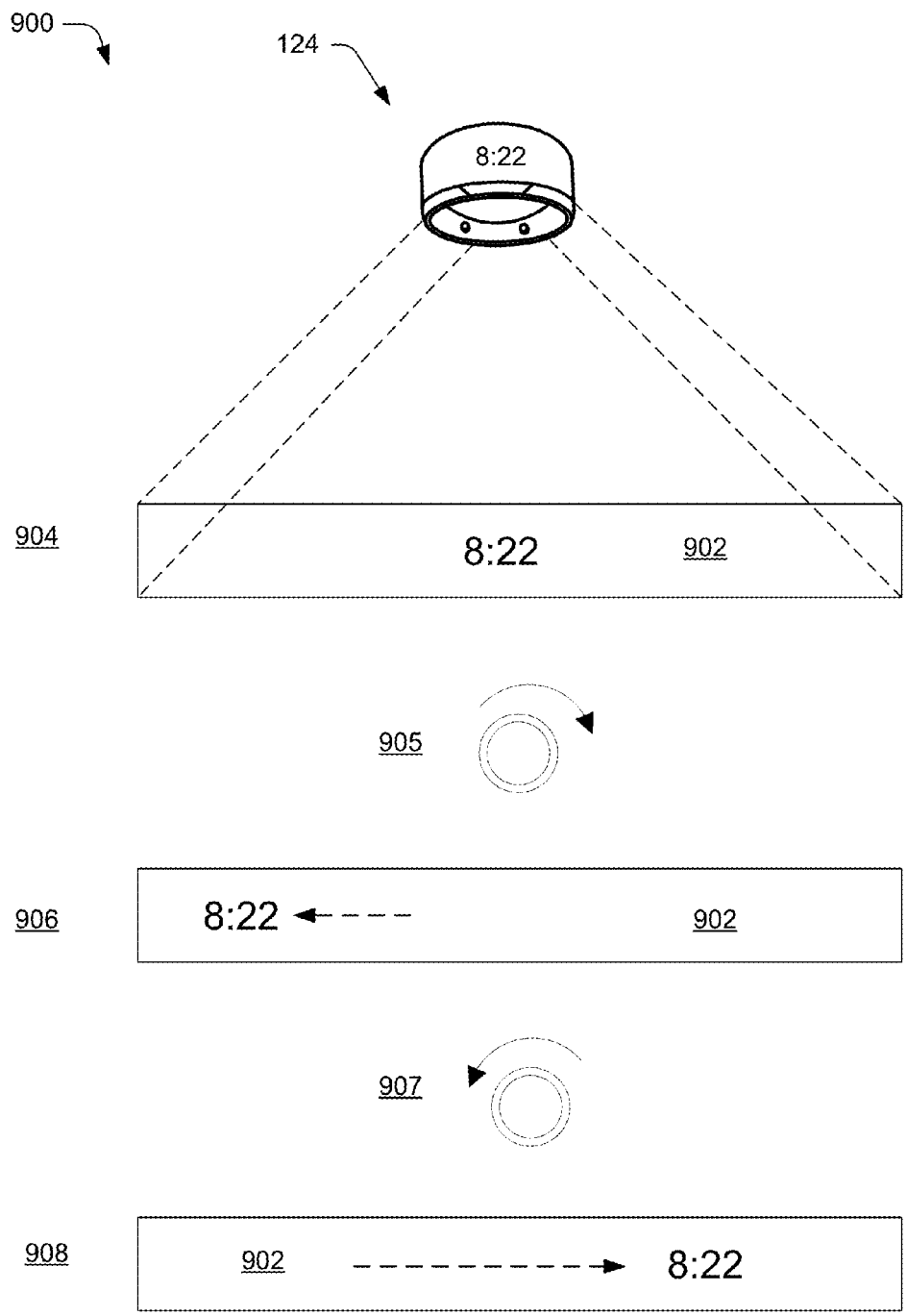
FIG. 9 is a diagram illustrating details of an example display adjustment scenario for switching between different display locations of a wearable device in accordance with one or more implementations.

To further illustrate, some example display adjustment scenarios for wearable devices 124 are depicted and discussed in relation to FIGS. 8 and 9. In particular, FIG. 8 is a diagram illustrating generally at 800 details of an example display adjustment scenario with a wearable device in accordance with one or more implementations. In this example, a wearable device 124 in the form of a smart watch is depicted in multiple hand/arm positions along with corresponding arrangements of a user interface 801 with different output positions. The user interface 801 in this example is configured to display a weather alert to the user along with the time. In position 802 of the user's hand 803, the example user interface 801 is output in an arrangement 804 in which the weather alert is rotated at an angle slightly clockwise around a display of the watch. The arrangement 804 may be configured to align the user interface 801 with a position of the user. This may occur by using a camera of the watch to track user position as noted previously as well as based on analysis to determine the spatial orientation of the watch with respect to the user.

In response to manipulation of the device, the display manager 130 may cause rotation of the user interface 801 to compensate for the manipulation. By way of example, FIG. 8 represents body movement 805 which causes repositioning of the user's hand 803 from position 802 to position 806. In position 806 of the user's hand 803, the example user interface 801 is output in an arrangement 808 in which the weather alert is rotated further clockwise around the display of the watch relative to position 802. This further clockwise rotation compensates for the change in the spatial orientation of the watch with respect to the user caused by repositioning of the user's hand 803. By so doing, the display manager 130 may maintain alignment of the user interface 801 with the position of the user, such as a viewing angle and/or eye position that is being tracked via the watch.

FIG. 8 represents additional body movement 809, which causes repositioning of the user's hand 803 from position 806 to position 810. In position 810 of the user's hand 803, the example user interface 801 is output in an arrangement 808 in which the weather alert is rotated even further clockwise around the display of the watch relative to position 802. The user interface 801 is now generally arranged perpendicular to the user's wrist/arm and in-line with a band of the watch. Accordingly, the display manager 130 may again maintain alignment of the user interface 801 with the position of the user. It is noted, that elements/UIs may be repositioned at various angular increments around a display of a wearable device in the manner previously described. The display elements may also be continuously adjusted in three-hundred and sixty degree rotation around a display responsive to body movements, changes in user position, and/or device manipulations.

FIG. 9 is a diagram illustrating generally at 900 details of an example display adjustment scenario for switching between different display locations associated with a wearable device. In this example, a wearable device 124 in the form of a smart band is illustrated. The exterior surface of the smart band may be configured to have multiple different display locations at which content may be displayed. For example, the smart band may be configured to have a display that extends circularly around the exterior surface. Alternatively, two or more individual display devices may be disposed a different locations around the exterior surface. The multiple different display locations enable modifications of output positions for content in response to manipulation of the smart band.

In particular, a projection of the exterior surface 902 of the example smart band is depicted in FIG. 9. The projection provides an unwound, flat representation of the exterior surface 902. In state 904, the time "8:22" is represented as being output at a central position on the projection of the exterior surface 902. In response to clockwise rotation 905 of the smart band (such as by twisting of a user's wrist), the output location for the time is modified to attain a state 906 in which the time is now shifted to a position at the left of the exterior surface 902. Likewise, in response to counter-clockwise rotation 907 of the smart band (such as by twisting of a user's wrist), the output location for the time is modified to attain a state 908 in which the time is now shifted to a position at the right of the exterior surface 902. Thus, the display location for the time may be modified based on manipulation of the band, which can cause corresponding changes in positional relationships of and between the band and user. Such positional relationships may be recognized and tracked using various combinations of sensors as discussed throughout this document. The display location may move between multiple discrete locations around the band or alternatively may appear to shift continuously around the exterior surface 902.

Having considered example details and procedures for enhanced display rotation, consider a discussion of an example system in accordance with one or more implementations.

Example System

Figure 10:
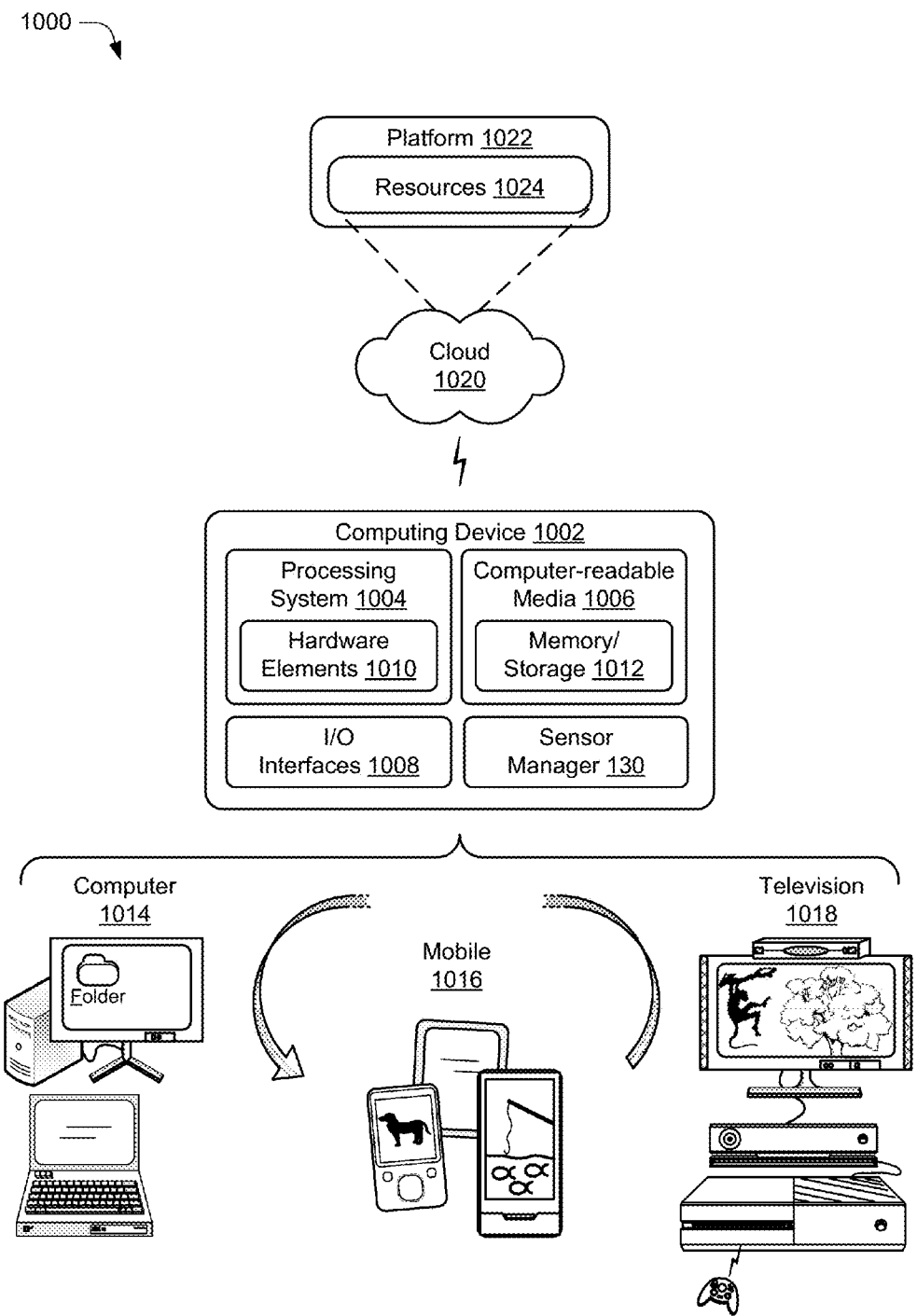
FIG. 10 is a block diagram of a system that can be employed for enhanced display rotation in accordance with one or more implementations.

FIG. 10 illustrates an example system 1000 that includes an example computing device 1002 that is representative of one or more computing systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 1002, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, display manager 130, user tracking module 214, device orientation module 216, and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This is illustrated through inclusion of the display manager 130 on the computing device 1002. The functionality represented by the display manager 130 and other modules/applications may also be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving an indication of at least one of a selectable type of auto-rotation, a number of pre-defined rotational positions, and corresponding angular increments, wherein the angular increments are selectively varied for different devices, scenarios, applications, or contexts;
   collecting sensor data from multiple sensors associated with a sensor system of a device;
   detecting changing viewing positions of a user relative to the device, the changing viewing positions detected based in part on a viewing plane and a viewing angle with respect to the user;
   calculating, as one of the changing viewing positions, a viewing position of the user relative to the device and alignment of the device as coordinates in a three-dimensional coordinate system;
   rotating a user interface on a display of the device through incremental rotational positions that are each one of a selected number of the pre-defined rotational positions that correspond to the angular increments; and
   controlling arrangement of one or more displayed elements in the user interface on the display of the device based on the calculated viewing position of the user of the device and the alignment of the device, type of auto-rotation, and a selected device, scenario, application, or context.

2. The computer-implemented method of claim 1, wherein collecting the sensor data comprises tracking eyes of the user via a camera of the device, the viewing position of the user relative to the device calculated at least in part based on the tracking.

3. The computer-implemented method of claim 1, wherein collecting the sensor data comprises obtaining data via a magnetometer of the device used to determine the alignment of the device relative to a magnetic direction.

4. The computer-implemented method of claim 1, wherein controlling the arrangement of the one or more displayed elements comprises causing rotation of the user interface between two or more of the pre-defined rotational positions.

5. The computer-implemented method of claim 1, wherein controlling the arrangement of the one or more displayed elements comprises alignment of the one or more displayed elements with the viewing plane established by the calculated viewing position of the user of the device.

6. The computer-implemented method of claim 1, wherein controlling the arrangement of the one or more displayed elements comprises switching display of the one or more displayed elements between multiple different display locations provided by the device to compensate for manipulation of the device.

7. The computer-implemented method of claim 1, wherein controlling the arrangement of the one or more displayed elements comprises causing rotation of the one or more displayed elements to multiple different angular positions to compensate for manipulation of the device, the multiple different angular positions corresponding to the pre-defined rotational positions.

8. The computer-implemented method of claim 7, wherein the multiple different angular positions correspond to degree increments of less than forty-five degrees.

9. The computer-implemented method of claim 7, wherein the multiple different angular positions correspond to degree increments of one degree that enable arrangement of the one or more elements into three-hundred and sixty angular positions.

10. The computer-implemented method of claim 1, wherein the device comprises a computing device having a slate form factor.

11. The computer-implemented method of claim 1, wherein the device comprises a wearable computing device.

12. A computing device comprising:
a display device;
a sensor system having multiple sensors including a camera and a magnetometer; and
a display manager configured to:
receive an indication of at least one of a selectable type of auto-rotation, a number of pre-defined rotational positions, and corresponding angular increments, wherein the angular increments are selectively varied for different devices, scenarios, applications, or contexts;
obtain sensor data collected from the multiple sensors including tracking eyes of a user of the computing device via the camera and obtaining directional data via the magnetometer;
calculate a viewing plane and a viewing angle based at least in part on the tracking the eyes of the user;
calculate a viewing position of a user relative to the computing device based upon the calculated viewing plane and viewing angle and alignment of the device relative to a magnetic direction based on the directional data; and
automatically rotate a user interface exposed on the display device to a rotational position of a user selected number of the pre-defined rotational positions of the computing device that corresponds to the calculated viewing position of the user of the computing device and the alignment of the computing device, type of auto-rotation, and a selected device, scenario, application, or context, the pre-defined rotational positions corresponding to the angular increments.

13. A computing device as recited in claim 12, wherein the display manager is configured to perform the rotation of the user interface to compensate for manipulation of the computing device using sensor data that is supplied by the sensor system.

14. A computing device as recited in claim 12, wherein the user interface is rotatable through the incremental rotational positions in the angular increments of about ten degrees or less.

15. A computing device as recited in claim 12, wherein the viewing position of the user relative to the computing device indicates that the computing device is placed in a flat position upon a surface, the display manager configured to cause rotation of the user interface while the computing device is in the flat position.

16. A computing device as recited in claim 12, wherein the viewing position of the user relative to the computing indicates that user is lying in a flat position upon a surface, the display manager configured to control rotation of the user interface while the user is in the flat position to align content in the user interface relative to a head position of the user.

17. A wearable device comprising:
a sensor system having one or more sensors;
a display manager module configured to:
receive an indication of at least one of a selectable type of auto-rotation, a number of ore-defined rotational positions, and corresponding angular increments, wherein the angular increments are selectively varied for different devices, scenarios, applications, or contexts;
collect sensor data from the one or more sensors, the sensor data including indications regarding alignment of the wearable device relative to a magnetic direction;
ascertain a changing spatial orientation of the wearable device with respect to a user interacting with the wearable device based on the collected sensor data, the changing spatial orientation of the wearable device ascertained based in part on a viewing plane and a viewing angle with respect to the user, and based on a circular rotation of the wearable device that includes a display extending circularly in a circular band of the wearable device; and
modify output positions for content displayed on the display integrated in the circular band of the wearable device from a first display region of the display to a second display region of the display to align with the changing spatial orientation, based on the type of auto-rotation and a selected device, scenario, application, or context.

18. The wearable device of claim 17, wherein the display manager module is implemented at least partially by hardware elements of the wearable device.

19. The wearable device of claim 17, wherein the display manager module is configured to modify the output positions by rotation of a user interface exposed on the display of the wearable device into one of eight or more different angular rotations supported by the display manager module that corresponds to the changing spatial orientation.

20. The wearable device of claim 17, wherein:
the display that is integrated in the circular band of the wearable device comprising individual display devices at separate display locations in the circular band; and
the display manager is configured to modify the output positions for the content displayed by selectively switching output of the content between the separate display locations of the wearable device in response to manipulation of the wearable device.

* * * * *